United States Patent [19]

Haarstad et al.

[11] Patent Number: 4,781,219

[45] Date of Patent: Nov. 1, 1988

[54] FLUID CONTROLLER AND DAMPENING FLUID PATH

[75] Inventors: Donald M. Haarstad, Chaska, Minn.; Douglas M. Gage, Dubuque, Iowa

[73] Assignee: Eaton Corporation, Cleveland, Ohio

[21] Appl. No.: 37,493

[22] Filed: Apr. 13, 1987

Related U.S. Application Data

[63] Continuation-in-part of Ser. No. 917,565, Oct. 10, 1986, abandoned.

[51] Int. Cl.$^4$ .............................................. F15B 13/04
[52] U.S. Cl. ................................ 137/625.24; 60/384; 91/467; 137/596.13
[58] Field of Search ...................... 137/596.13, 625.24; 60/384; 91/467

[56] References Cited

U.S. PATENT DOCUMENTS

| | | | |
|---|---|---|---|
| 3,959,968 | 6/1976 | Griener | 60/384 X |
| 3,960,234 | 6/1976 | Morgan | 60/384 X |
| 4,033,377 | 7/1977 | Johnson | 60/384 X |
| 4,037,620 | 7/1977 | Johnson | 60/384 X |
| 4,050,474 | 9/1977 | Morgan | 60/384 X |
| 4,096,883 | 6/1978 | Yip | 60/384 X |
| 4,109,679 | 8/1978 | Johnson | 60/384 X |
| 4,167,893 | 9/1979 | Johnson | 91/467 X |
| 4,620,416 | 11/1986 | Yip et al. | 60/384 |

*Primary Examiner*—Gerald A. Michalsky
*Attorney, Agent, or Firm*—L. J. Kasper

[57] ABSTRACT

A fluid controller (17) is disclosed for controlling the flow of fluid to a steering cylinder (19). The controller includes a fluid meter (51) and a valving arrangement (49) including a valve spool (65) and a sleeve (67). The valving (49) defines a main fluid path including a main variable flow control orifice (121), a variable flow control orifice (123), the fluid meter (51), the steering cylinder (19), and a variable flow control orifice (125). In accordance with the invention, the valving (49) defines a dampening fluid path including a variable dampening orifice (133), the dampening fluid path being in parallel with the main fluid path to dampen pressure spikes in the main fluid path. The size of the variable dampening orifice (133), and the flow therethrough, is a function of the relative displacement between the spool (65) and sleeve (67), whereby the timing and amount of the dampening flow and the relationship thereof to the gain curve of the main fluid path can be selected as desired.

25 Claims, 9 Drawing Sheets

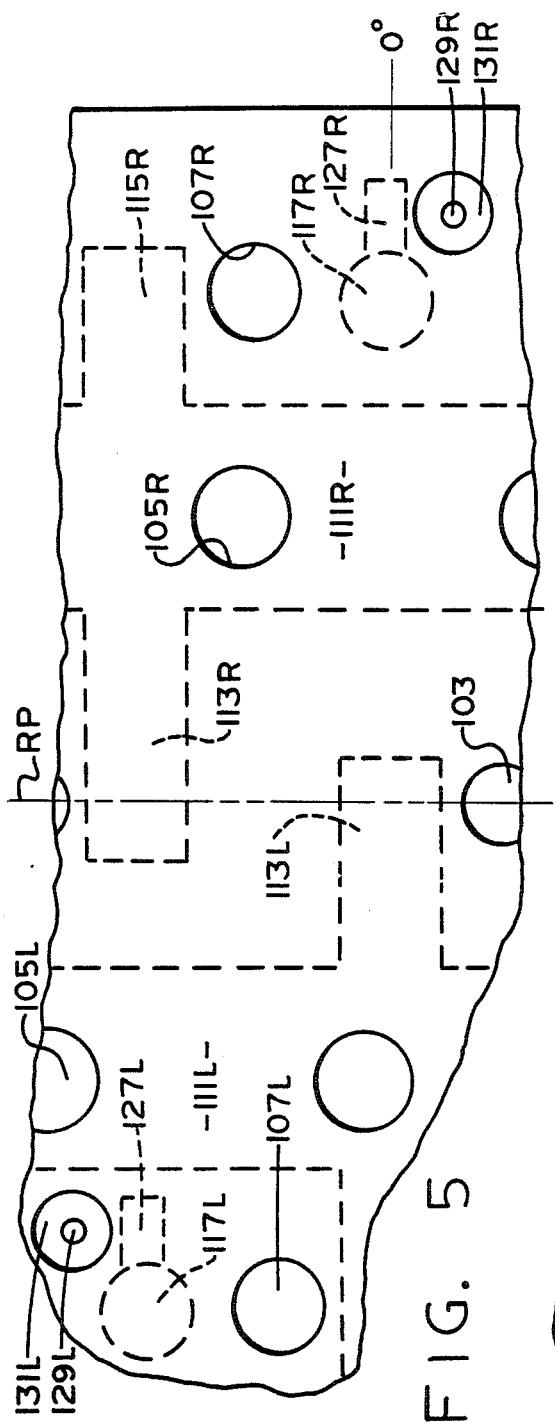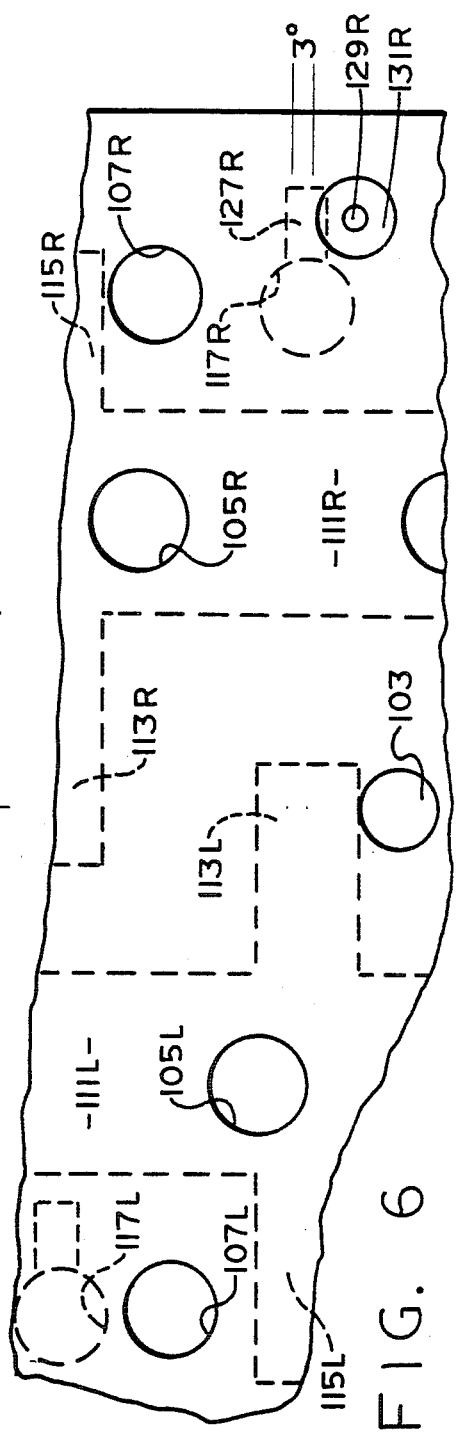
FIG. 5
FIG. 6

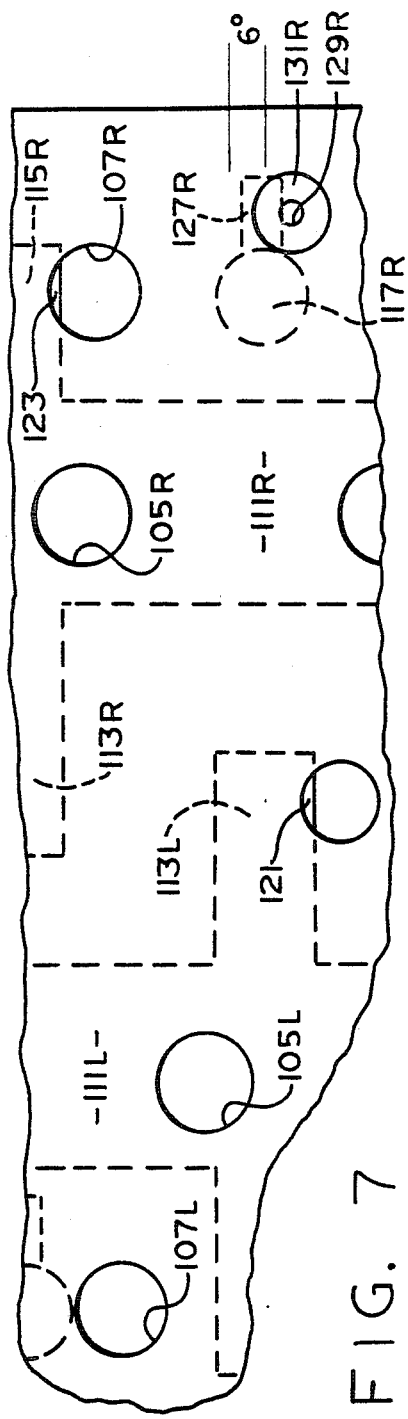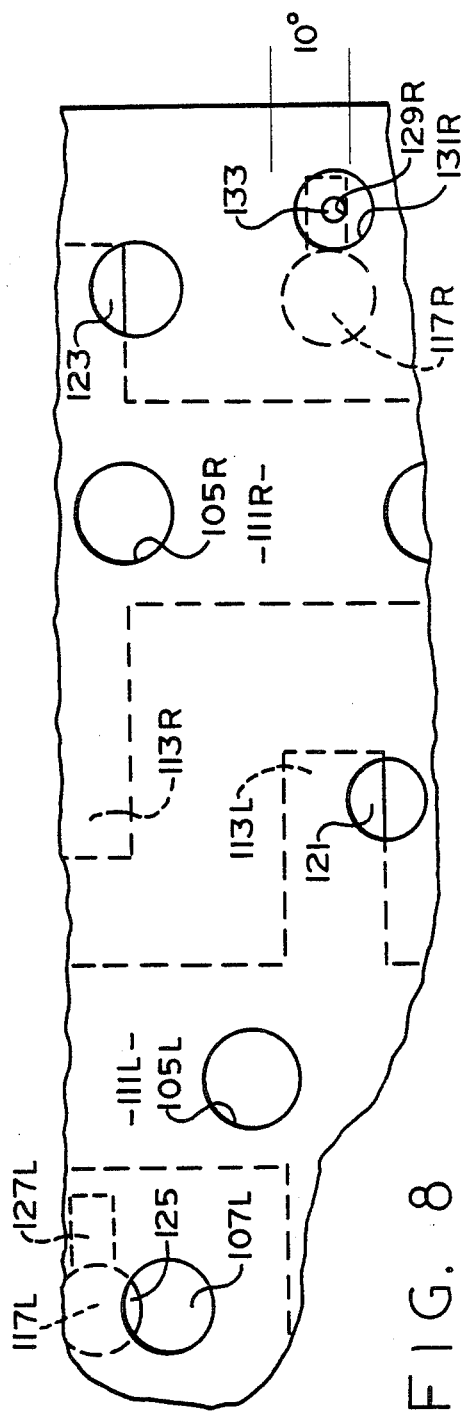

FLUID CONTROLLER AND DAMPENING FLUID PATH

CROSS-REFERENCE TO RELATED APPLICATION

This application is continuation-in-part of U.S. Ser. No. 917,565 filed Oct. 10, 1986, now abandoned.

BACKGROUND OF THE DISCLOSURE

The present invention relates to fluid controllers of the type used to control the flow of fluid from a source of presurized fluid to a fluid pressure operated device such as a steering cylinder.

A typical fluid controller of the type to which the present invention relates includes a housing which defines various fluid ports, and further includes a fluid meter, valving and an arrangement for imperting follow-up movement to the valving in accordance with the flow through the fluid meter. The flow through the controller valving is directly proportional to the area of the main variable flow control orifice, which, in turn, is proportional to the rate at which the steering wheel is rotated.

Fluid controllers of the type to which the invention relates are frequently used on large, heavy vehicles. More particularly, such controllers are frequently used on articulated vehicles which have high inertia loads on the opposite side of the wheels from the pivot joint. The weight of such vehicles, and the inertia loads have made it difficult to achieve smooth steering action, and as a result, it has become common practice on such vehicles to provide a cushion valve in the lines interconnecting the fluid controller and the steering cylinder, although an accumulator could be used instead.

The use of an accumulator in the circuit has normally resulted in satisfactory performance, but the accumulator adds substantial expense to the cost of the system and requires a substantial amount of additional maintenance. On the other hand, a cushion valve, such as the type shown in U.S. Pat. No. 4,040,439, assigned to the assignee of the present invention, provides generally satisfactory cushioning of a first pressure spike, but not of immediately successive spikes. In addition, a typical cushion valve adds very substantially to the cost of the system.

SUMMARY OF THE INVENTION

Accordingly, it is an object of the present invention to provide an improved steering system of the type including a fluid controller and a steering cylinder, wherein the system has the capability of cushioning or dampening pressure pulses and spikes in the lines between the controller and the steering cylinder, without the need for separate components such as accumulators and cushion valves.

It is a more specific object of the present invention to provide such an improved system wherein the cushioning or dampening capability is integral with the valving of the fluid controller.

It is a further object of the present invention to provide an improved fluid controller for use in a steering system wherein the controller valving defines a dampening fluid path having a flow versus valve deflection relationship which is tailored to match the flow versus valve deflection curve for the main fluid path of the controller.

The above and other objects are accomplished by the provision of an improved controller of the type including housing means defining an inlet port for connection to the source of pressurized fluid, a return port for connection to a reservoir, and first and second control fluid ports for connection to the steering cylinder. Valve means is disposed in the housing and defines a neutral position and a first operating position. The housing and the valve means cooperate to define a main fluid path communicating between the inlet port and the first control fluid port and between the second control fluid port and the return port when the valve means is in the first operating position. The controller includes fluid actuated means for imparting follow-up movement to the valve means proportional to the volume of fluid flow through the main fluid path, which includes a first variable flow control orifice disposed between the inlet port and the first control fluid port. The first variable orifice has its minimum flow area when the valve means is in the neutral position, and an increasing flow area as the valve means is displaced toward the first operating position, and a maximum flow area when the valve means is moved to its maximum displacement from the neutral position.

The improved controller is characterized by the housing means and the valve means cooperating to define a dampening fluid path in parallel with the main fluid path, the dampening fluid path being in fluid communication with the main fluid path at a first location disposed between the first variable flow control orifice and the first control fluid port, and at a second location disposed between the second control fluid port and the return port. The dampening fluid path includes a variable dampening orifice operable to dampen the flow of pressurized fluid in the main fluid path to the first control fluid port to thereby cushion the operation of said controller. The variable dampening orifice begins to open after the first variable flow control orifice begins to open, as the valve means moves from its neutral position to its maximum displacement position.

In accordance with a more limited aspect of the present invention, the variable dampening orifice begins to close before the first variable flow control orifice reaches its maximum flow area, and preferably, is completely closed before the first variable flow control orifice reaches its maximum flow area.

BRIEF DESCRIPTION OF THE DRAWINGS

FIG. 5 is a further enlarged, fragmentary overlay view, similar to FIG. 3, with the valving in the neutral position.

FIGS. 6–8 and 11 are also further enlarged, fragmentary overlay views of the valving, similar to FIG. 5, but with the valving displaced from the neutral position by three degrees; six degrees; ten degrees; and eighteen degrees, respectively.

DESCRIPTION OF THE PREFERRED EMBODIMENT

Figure 1:
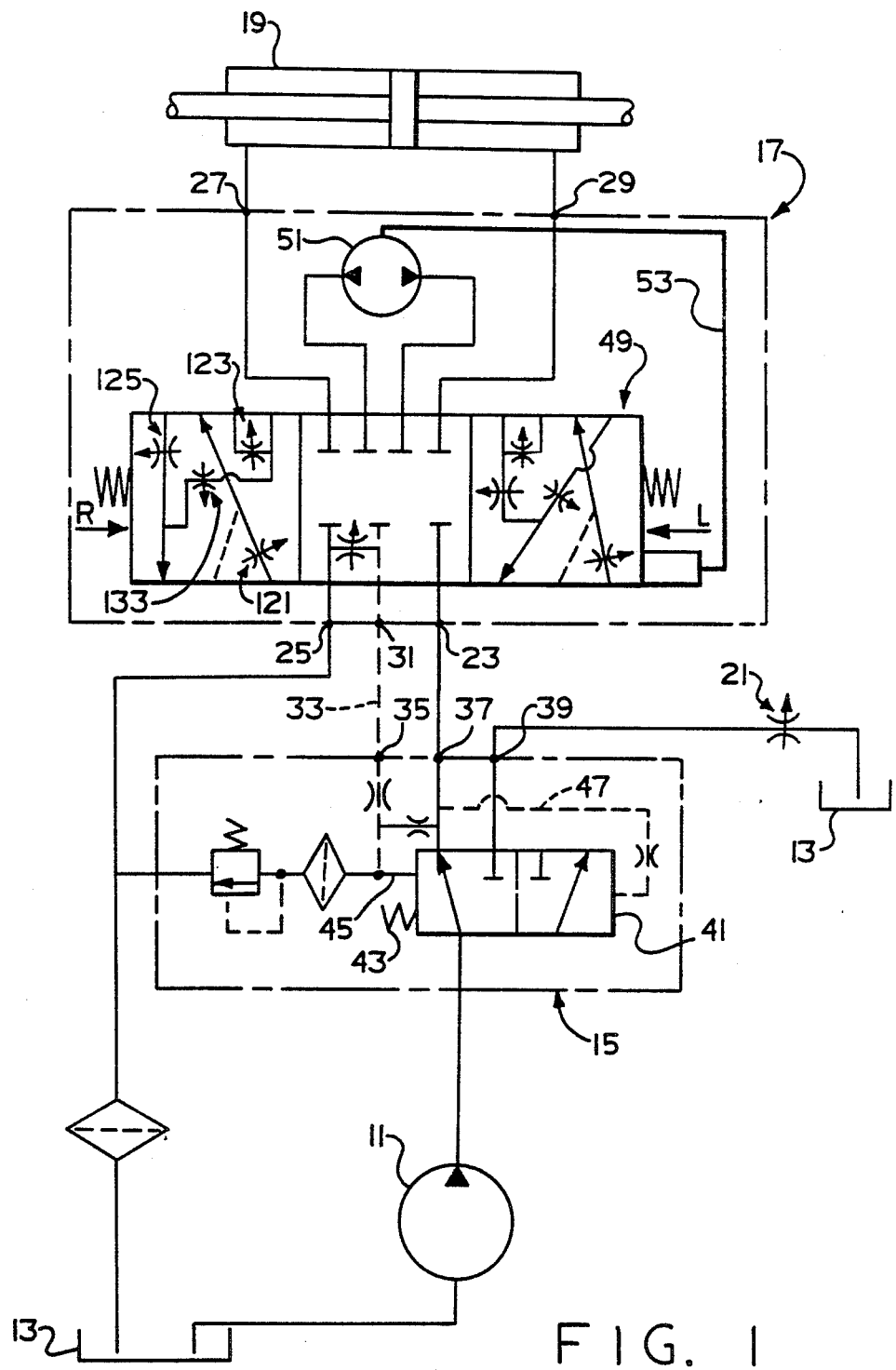
FIG. 1 is a hydraulic schematic of a load sensing, hydrostatic power steering system of the type with which the present invention may be utilized.

Referring now to the drawings, which are not intended to limit the invention, FIG. 1 is a hydraulic schematic of a vehicle hydrostatic steering system including a fluid controller made in accordance with the teachings of the present invention. The system includes a fluid pump 11, shown herein as a fixed displacement pump, having its inlet connected to a system reservoir 13. The system also includes a pilotoperated, load sensing priority flow control valve, generally designated 15. The control valve 15 apportions the flow of fluid from the pump 11 between (1) a primary circuit including a fluid controller, generally designated 17, and a fluid operated steering cylinder 19; and (2) an open-center auxiliary circuit, represented by a variable orifice designated 21.

Referring still to FIG. 1 the fluid controller 17 includes an inlet port 23, a return port 25, and a pair of control (cylinder) ports 27 and 29 which are connected to the opposite ends of the steering cylinder 19. The fluid controller 17 further includes a load signal port 31, which is connected to a load signal line 33 which, in turn, is connected to a load signal port 35 of the priority valve 15 as is well known in the art.

The priority flow control valve 15 may be of the type illustrated in U.S. Pat. No. 3,455,210, assigned to the assignee of the present invention, and incorporated herein by reference. The priority valve 15 includes a priority outlet port 37 which is connected to the inlet port 23 of the controller 17, and an excess flow outlet port 39 which is connected to the auxiliary circuit 21. The priority valve 15 includes a valve spool 41 which is biased by a spring 43 toward a position permitting substantially all inlet fluid to flow to the priority outlet port 37. The spring 43 is aided by the pressure in a signal line 45 communicating between the load signal port 35 and the end of the valve spool 41. In opposition to these biasing forces is the pressure exerted by a pilot signal 47, communicated from upstream of the priority outlet port 37 to the opposite end of the valve spool 41. The general structure and operation of the priority valve 15 are well known in the art, and because they form no direct part of the present invention, they will not be described further herein.

The fluid controller 17, which will be described in greater detail in conjunction with FIG. 2, may be of the general type illustrated and described in U.S. Pat. No. Re. 25,126, and in the subject embodiment, is more specifically of the type illustrated and described in U.S. Pat. No. 4,109,679, both of which are assigned to the assignee of the present invention and incorporated herein by reference. Disposed within the fluid controller 17 is a valving arrangement, generally designated 49, which is movable from its neutral position shown in FIG. 1 to either a right turn position R or a left turn position L. When the valving arrangement 49 is in either of the turn positions, the pressurized fluid passing through the valving 49 flows through a fluid meter 51, one function of which is to measure (meter) the proper amount of fluid to be communicated to the appropriate control port 27 or 29. As is well known to those skilled in the art, the other function of the fluid meter 51 is to provide follow-up movement to the valving 49, such that the valving 49 is returned to its neutral position after the desired amount of fluid has been communicated to the steering cylinder 19. In FIG. 1, this follow-up movement is achieved by means of a mechanical follow-up connection, indicated schematically at 53.

As may best be seen schematically in FIG. 1, the valving arrangement 49 defines a plurality of variable orifices whenever the valving 49 is moved from its neutral position to one of its operating positions, either a right turn position R or a left turn position L. These variable orifices will be described in greater detail subsequently, in conjunction with the detailed description of FIGS. 4, 7, 8 and 11.

FLUID CONTROLLER 17

Figure 2:
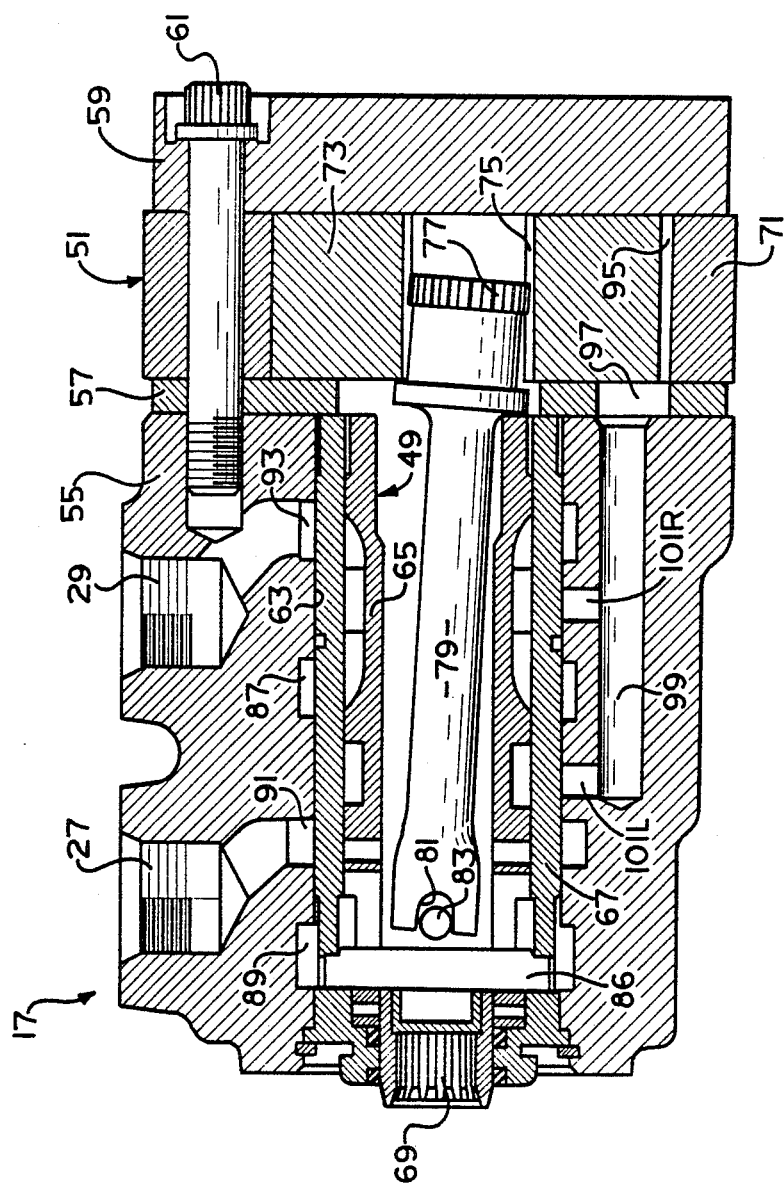
FIG. 2 is an axial cross-section of a fluid controller of the type to which the present invention relates.

Referring now to FIG. 2, the construction of the fluid controller 17 will be described in some detail. The fluid controller 17 comprises several sections, including a housing section 55, a port plate 57, a section comprising the fluid meter 51, and an end plate 59. These sections are held together in tight sealing engagement by means of a plurality of bolts 61 which are in threaded engagement with the housing section 55. The housing section 55 defines the inlet port 23, and return port 25, (not shown in FIG. 2) and the control ports 27 and 29.

Rotatably disposed within a valve bore 63 defined by the housing section 55 is the valving arrangement 49 which is shown schematically in FIG. 1. The valving 49 comprises a primary, rotatable valve member 65 (hereinafter referred to as the "spool"), and a cooperating, relatively rotatable follow-up valve member 67 (hereinafter referred to as the "sleeve"). At the forward end of the spool 65 is a portion having a reduced diameter and defining a set of internal splines 69 which provide for a direct mechanical connection between the spool 65 and a steering wheel (not shown). The spool 65 and sleeve 67 will be described in greater detail subsequently.

The fluid meter 51 may be of the type well known in the art, and includes an internally-toothed ring 71, and an externally-toothed star 73. The star 73 defines a set of internal splines 75, and in splined engagement therewith is a set of external splines 77 formed at the rearward end of a drive shaft 79. The drive shaft 79 has a bifurcated forward end 81 permitting driving connection between the shaft 79 and the sleeve 67, by means of a pin 83 passing through a pair of pin openings 85 (see FIGS. 3 and 4, not shown in FIG. 2) in the spool 65. Thus, pressurized fluid flowing through the valving 49 in response to rotation of the spool 65 flows through the fluid meter 51, causing orbital and rotational movement of the star 73 within the ring 71. Such movement of the star 73 causes follow-up movement of the sleeve 67, by means of the drive shaft 79 and pin 83 (which comprise the follow-up connection 53 of FIG. 1), to maintain a particular relative displacement between the spool 65 and sleeve 67, proportional to the rate of rotation of the steering wheel. A plurality of leaf springs 86 extend through an opening in the spool 65, biasing the sleeve 67 toward the neutral position, relative to the spool 65.

Referring still to FIG. 2, it may be seen that the housing section 55 defines four annular chambers surrounding the valving 49, to provide fluid communication between the valving 49 and the various ports. An annular chamber 87 receives pressurized fluid from the inlet port 23, while an annular chamber 89 communicates return fluid to the return port 25. In addition, an annular chamber 91 provides communication between the valving 49 and the control port 27 while an annular chamber 93 provides communication between the valving 49 and the control port 29.

The toothed interaction of the star 73, orbiting and rotating within the ring 71, defines a plurality of expanding and contracting fluid volume chambers 95, and adjacent each chamber 95, the port plate 57 defines a fluid port 97. The housing section 55 defines a plurality of axial bores 99 (only one of which is shown in FIG. 2), each of which is in open communication with one of the fluid ports 97. The housing section 55 further defines a pair of radial bores 101 L and 101 R providing communication between each of the axial bores 99 and the valve bore 63, as will be described in greater detail subsequently.

VALVING ARRANGEMENT 49

Figure 3:
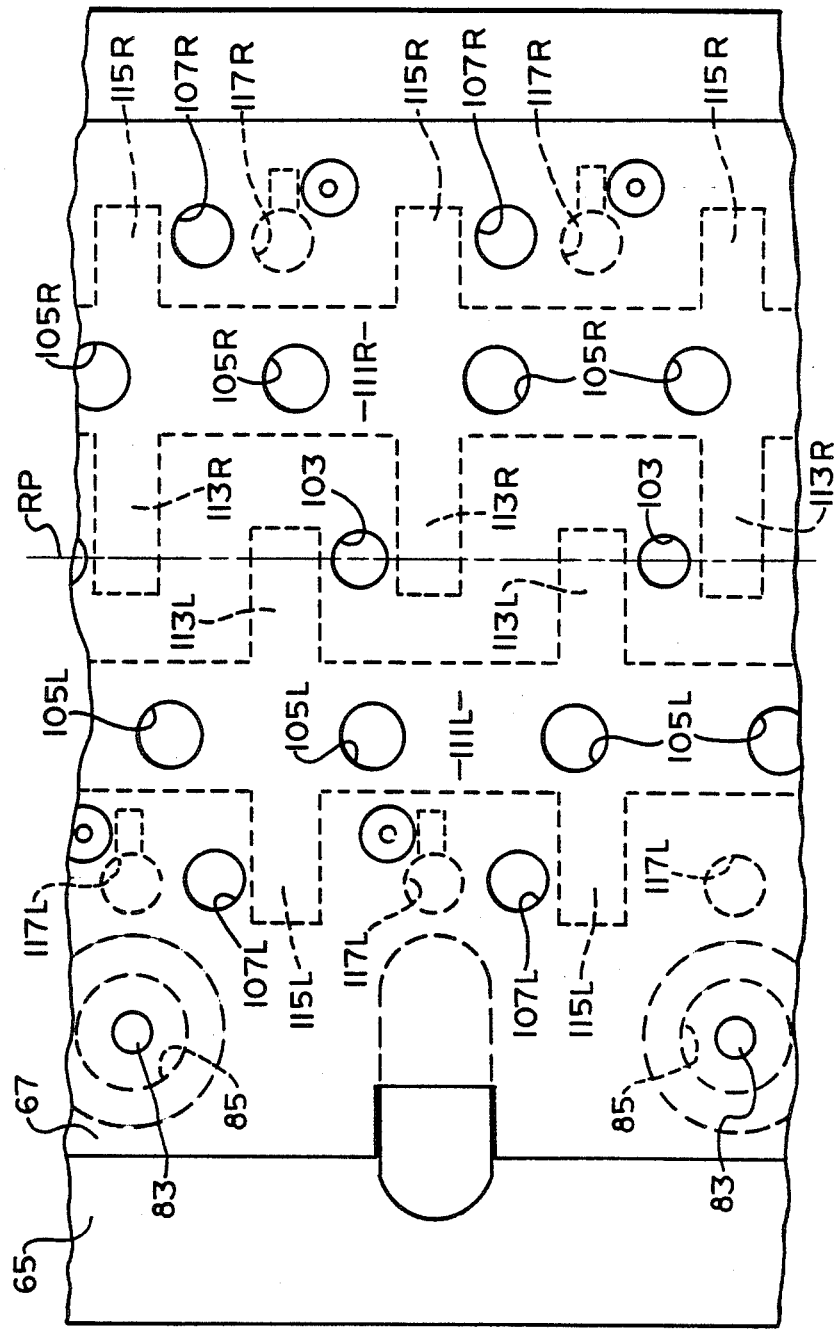
FIG. 3 is an overlay view of the valving used in the fluid controller shown in FIG. 2, with the valving in the neutral position, but on a larger scale than FIG. 2.
Figure 4:
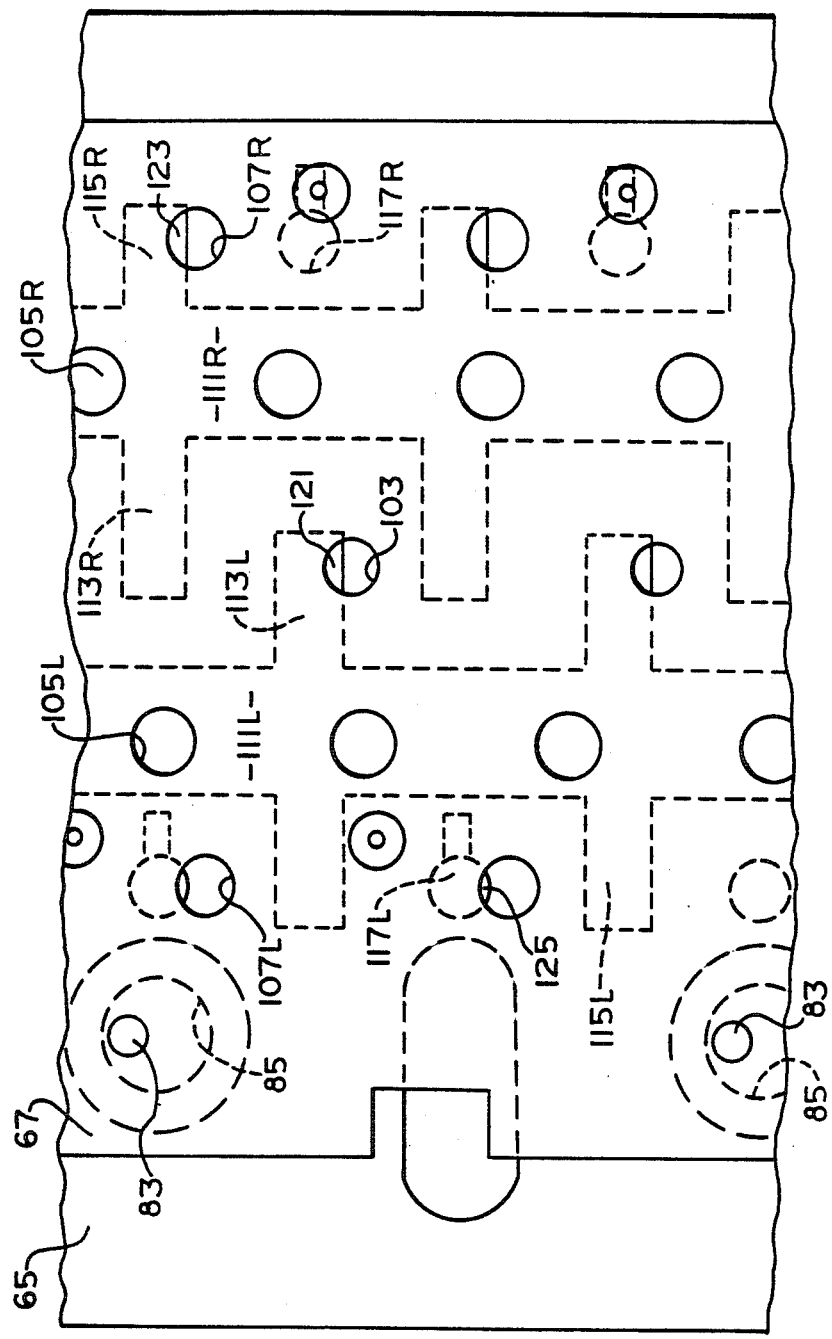
FIG. 4 is an overlay view, similar to FIG. 3, but with the valving displaced to an operating position.

Referring now primarily to FIG. 3, the spool 65 and sleeve 67 will be described in greater detail. In connection with the subsequent description, it should be noted that many of the ports and passages are arranged symmetrically with respect to a central reference plane RP, and such elements will be described by a reference numeral followed by either an R or an L to indicate that the element is located on either the right side or the left side, respectively of the reference plane RP. On the other hand, certain of the elements do not have a corresponding element oppositely disposed about the reference plane RP and will be referred to by use of a reference numeral alone. Furthermore, it should be understood that the overlay views in FIGS. 3 and 4 are intended to illustrate only the interface between the spool 65 and sleeve 67, and as a result, do not show the various annular chambers 87 through 93 defined by the housing section 55.

The sleeve 67 defines a plurality of pressure ports 103, which are disposed to be in continuous fluid communication with the inlet port 23 by means of the annular chamber 87. Equally and oppositely disposed about the reference plane RP is a plurality of meter ports 105 L, and a plurality of meter ports 105 R. The meter ports 105 L are disposed for commutating fluid communication with the radial bores 101 L, while the meter ports 105 R are disposed for commutating fluid communication with the radial bores 101 R. Equally and oppositely disposed about the reference plane RP, and further therefrom than the meter ports 105 L and 105 R, respectively, is a plurality of operating ports 107 L, and a plurality of operating ports 107 R.

Referring still to FIG. 3, the spool 65 defines a pair of circumferential meter grooves 111 L and 111 R, equally and oppositely disposed about the reference plane RP, and disposed to be axially aligned with the meter ports 105 L and 105 R, respectively. In fluid communication with the meter groove 111 L is a plurality of pressure passages 113 L and in fluid communication with the meter groove 111 R is a plurality of pressure passages 113 R. Also in fluid communication with the meter groove 111 L is a plurality of operating passages 115 L, and in fluid communication with the meter groove 111 R is a plurality of operating passages 115 R. In addition to the above-described grooves and passages which are formed on the outer surface of the spool 65, the spool 65 defines a plurality of tank ports 117 L, alternately disposed between operating passages 115 L, and a plurality of tank ports 117 R, alternately disposed between operating passages 115 R. The tank ports 117 L and 117 R are in fluid communication with the interior of the valve spool 65 so that return fluid passes through the interior of the spool 65 and radially outward through the spring openings into the annular chamber 89 which communicates with the return port 25.

OPERATION OF VALVING

It is believed that the basic operation of the fluid controller 17 and valving arrangement 49 described thus far should be readily apparent in view of the teachings of above-incorporated U.S. Pat. No. 4,109,679. However, the operation of the controller and valving will be described briefly, partly to relate the structure illustrated in FIGS. 2-4 to the schematic of FIG. 1.

Referring still to FIG. 3, when the valving 49 is in the neutral position (no rotation of the steering wheel), pressurized fluid is communicated from the inlet port 23 to the annular chamber 87, and then through the pressure ports 103.

However, with the valving in the neutral position, flow through the pressure ports 103 is blocked by the outer surface of the spool 65, and there is no fluid flow through the valving 49 and fluid meter 51. Therefore, in the subject embodiment, the valving 49 is of the type referred to as "closed-center", although it will be apparent to those skilled in the art that the invention is not limited to closed-center valving. Furthermore, the fluid controller 17 was described previously in connection with FIG. 1 as being load sensing, although the particular structure by which the valving arrangement 49 is able to communicate a load signal port 31 forms no part of the present invention, and is not illustrated or described herein.

Referring now primarily to FIG. 4, when the steering wheel is rotated at a particular speed of rotation, the spool 65 is displaced, relative to the sleeve 67, by a particular rotational displacement which corresponds to the speed of rotation of the steering wheel. Thereafter, with continued rotation of the wheel, the fluid flowing through the fluid meter 51 results in follow-up movement of the sleeve 67 to maintain the particular rotational displacement.

FIG. 4 illustrates the valve spool 65 being displaced, relative to the sleeve 67, which corresponds to moving the valve arrangement 49 of FIG. 1 to the right turn position R. With the spool 65 displaced as shown in FIG. 4, pressurized fluid is able to flow from the pressure ports 103 into the respective pressure passages 113 L, the area of overlap therebetween cumulatively comprising a main variable flow control orifice 121 (see FIG. 1) which is commonly referred to as the $A_1$ orifice. Pressurized fluid flows from each of the pressure passages 113 L into the annular meter groove 111 L, then radially outward through the meter ports 105 L which are in commutating fluid communication with the radial bores 101 L, as was described previously. This pressurized, unmetered fluid is then communicated to the fluid meter 51 through certain of the axial bores 99, then returns from the fluid meter 51 through certain other of the axial bores 99 as pressurized, metered fluid. The metered fluid then flows through the radial bores 101 R which are in commutating fluid communication with the meter ports 105 R. Metered fluid flowing through the meter ports 105 R enters the annular meter groove 111 R, then flows into the operating passages 115 R, then flows through the respective operating ports 107 R. The overlap therebetween cumulatively comprises a variable flow control orifice 123 (see FIG. 1) which is commonly referred to as the $A_4$ orifice.

Fluid flowing through the operating ports 107 R enters the annular chamber 93, then flows to the control port 29, then to the right end of the steering cylinder 19. Fluid which is exhausted from the left end of the steering cylinder 19 is communicated through the control port 27 to the annular chamber 91, then through the operating ports 107 L, and through the tank ports 117 L, the area of overlap therebetween cumulatively comprising a variable flow control orifice 125 (see FIG. 1), which is commonly referred to as the $A_5$ orifice. As was described previously, return fluid which flows through the tank ports 117 then flows through the interior of the spool 65, then radially outward through the pin openings 85 to the annular chamber 89, from where fluid flows to the return port 25, and then to the system reservoir 13. The flow path described above will be referred to hereinafter as the "main fluid path", and it should be noted by reference to FIG. 1 that the load signal port 31 communicates with the main fluid path at a location immediately downstream from the main variable flow control orifice 121. It should be apparent that, if the spool is displaced, relative to the sleeve, in the opposite direction, so that the valving 49 is in the left turn position L, the flow through the valving 49 will be in the "opposite" direction, as that term will be understood from a reading and understanding of above-incorporated U.S. Pat. No. 4,109,679.

DAMPENING FLUID PATH

Referring now primarily to FIG. 5, the added elements which define the dampening fluid path of the present invention will be described. It should be noted that all of the elements described up to this point are elements which are already known, and have been illustrated and described in above-incorporated U.S. Pat. No. 4,109,679. Disposed on the surface of the spool 65, and in communication with one of the tank ports 117 L is a dampening slot 127 L. Similarly, disposed on the surface of the spool 65, and in communication with one of the tank ports 117 R is a dampening slot 127 R. In the subject embodiment, as may best be seen in FIGS. 3 and 4, there are two of the dampening slots 127 L and two of the dampening slots 127 R, although only one of each is shown in the enlarged fragmentary view of FIG. 5. It should be understood by those skilled in the art that the number of dampening slots 127 L and 127 R may be varied, and the flow area of each may be varied, in order to achieve the desired amount of dampening flow.

Figure 10:
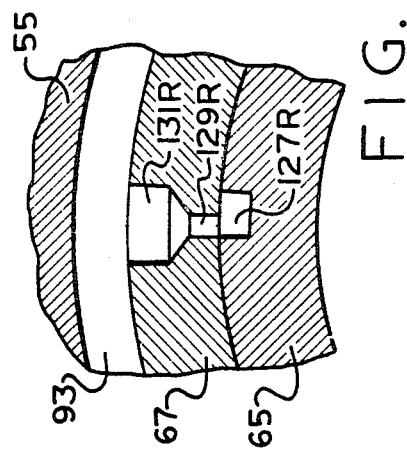
FIG. 10 is a transverse cross-section taken on line 10—10 of FIG. 9, and on the same scale.
Figure 9:
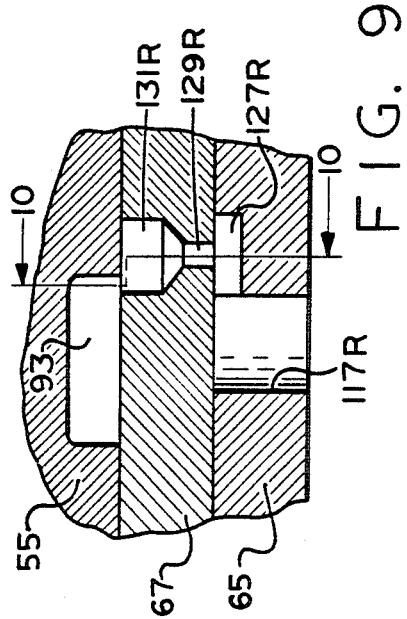
FIG. 9 is an enlarged, fragmentary axial cross-section, similar to FIG. 2, illustrating the dampening fluid path of the present invention.

The sleeve 67 defines a dampening bore 129 L disposed adjacent the dampening slot 127 L, and further defines a dampening bore 129 R, disposed adjacent the dampening slot 127 R, when the spool and sleeve are in their neutral position as shown in FIG. 5. As may best be seen in FIG. 9, each of the dampening bores 129 L and 129 R is in communication with the interior of the sleeve 67. The sleeve 67 also defines an enlarged counterbore 131 L in communication with the dampening bore 129 L, and a counterbore 131 R in communication with the dampening bore 129 R. As may also best be seen in FIG. 9, the axial position of the counterbore 131 R is selected such that there is continuous fluid communication between it and the annular chamber 93, and the relationship of the counterbore 131 L and the annular chamber 91 is substantially the same. It should be noted that FIGS. 9 and 10 do not relate to the neutral position shown in FIG. 5, and have been referred to at this point only as an aid in understanding the structure. FIGS. 9 and 10 will be referred to subsequently in connection with the description of FIG. 8. Referring still to FIG. 5, when the spool 65 and sleeve 67 are in the neutral position, there is no flow through the pressure ports 103. Similarly, there is no flow through the dampening bores 129 L or 129 R, because communication therethrough is blocked by the outer surface of the spool 65.

The operation of the valving arrangement 49, as well as the dampening fluid path of the present invention will now be described with reference to FIGS. 6–11. As appropriate, reference will also be made to the schematic of the valving 49 shown in FIG. 1, and as an aid in understanding the operation, reference will be made to the graph (FIG. 12) of flow (in gallons per minute) as a function of valve displacement or deflection (in degrees). It should be noted that in each of FIGS. 6, 7, 8 and 11, on the righthand end thereof is an indication of the number of degrees of relative rotation between the spool 65 and sleeve 67. It will be understood by those skilled in the art that the particular displacements illustrated in the subsequent figures, as well as the shape of each of the "gain" curves shown in FIG. 12 is by way of example only, and the invention is not limited to any particular shape of gain curve, and is not limited to any particular relationship between valve displacement and opening and closing of the various orifices.

Referring now to FIG. 6, the spool 65 has been displaced by about three degrees relative to the sleeve 67, and each of the pressure ports 103 is just beginning to communicate with its respective pressure passage 113 L. Therefore, the main variable flow control orifice 121 is just beginning to open as may be seen in the graph of FIG. 12 (see the flow curve labeled "121"). At this particular valve displacement, communication between the dampening bore 129 R and the dampening slot 127 R is still blocked, such that there is no flow through the dampening fluid path of the invention.

Referring now to FIG. 7, the spool 65 has now been displaced by about six degrees relative to the sleeve 67. At this particular valve displacement, there is now substantial communication between the pressure ports 103 and pressure passages 113 L (i.e., through the main variable flow control orifice 121), and there is also substantial communication between the operating passages 115 R and the operating ports 107 R (i.e., through the variable flow control orifice 123). Also, at this particular displacement, the dampening bore 129 R is just beginning to communicate with the dampening slot 127 R, the overlap therebetween comprising a variable dampening orifice 133 (see FIG. 1). As the variable dampening orifice 133 begins to open, the counterbore 131 R, the dampening bore 129 R, the dampening slot 127 R and the respective tank port 117 R cooperate to define a dampening fluid path, which includes the dampening orifice 133. The dampening fluid path communicates with the main fluid path at the location where the counterbore 131 R is in open communication with the annular chamber 93 (see FIG. 9), which is downstream of the variable flow control orifice 123. It is an important feature of the present invention that the dampening fluid path is in parallel with the main fluid path, i.e., that it permits a certain amount of fluid to be diverted from the main fluid path, rather than flowing to the control port 29 and to the steering cylinder 19. Fluid which is communicated from the main fluid path through the dampening fluid path flows to the interior of the spool 65 and recombines with return flow from the steering cylinder 19 which is flowing through the tank ports 117 L to the interior of the spool. However, it should be clearly understood that when the dampening fluid path is described as being "in parallel" with the main fluid path, it does not necessarily mean that the paths must recombine within the controller 17, although such an arrangement is preferred for simplicity. As may best be seen in FIG. 1, the dampening fluid path recombines with the main fluid path at a location which is schematically downstream of the variable flow control orifice 125, which is preferred, in order that the flow of dampening fluid is not restricted, as it would be if the dampening fluid path recombined with the main fluid path at a location upstream of the variable orifice 125.

Referring now to FIG. 8, the spool 65 has been displaced by about ten degrees relative to the sleeve 67. At this particular valve displacement, there is now even greater communication through the main variable flow control orifice 121, as well as through the variable flow control orifices 123 and 125. As a result, in FIG. 12, the flow through the main orifice 121 is up to 8 gpm at ten degrees of valve displacement. In the subject embodiment, this particular valve displacement is being illustrated partly because the dampening bore 129 R is now fully in communication with the dampening slot 127 R, such that the flow through the variable dampening orifice 133 has now reached its maximum. In the graph of FIG. 12, the curve labeled 133 reaches a flow of 2 gpm at ten degrees of valve displacement. Also in FIG. 12 is a flow curve labeled "29" which represents the flow through the main variable flow control orifice 121 minus the flow through the dampening orifice 133, or in other words, the net flow to the control port 29. It may be seen by comparing curves 121 and 133 in FIG. 12, that the flow through the dampening fluid path is preferably no more than about 25 percent of the flow through the main variable flow control orifice 121, as the valving is displaced up to about ten degrees. Thereafter, as the flow through the main variable flow control orifice 121 continues to increase, and the flow through the variable dampening orifice 133 remains substantially constant, the dampening flow, as a percent of the flow through the main fluid path actually decreases.

Reference is now made to FIGS. 9 and 10, in conjunction with FIG. 8, because, as may best be seen in FIG. 10, the position of the dampening bore 129 R and counterbore 131 R relative to the dampening slot 127 R as illustrated in FIGS. 9 and 10 corresponds to the position shown in FIG. 8.

Figure 11:
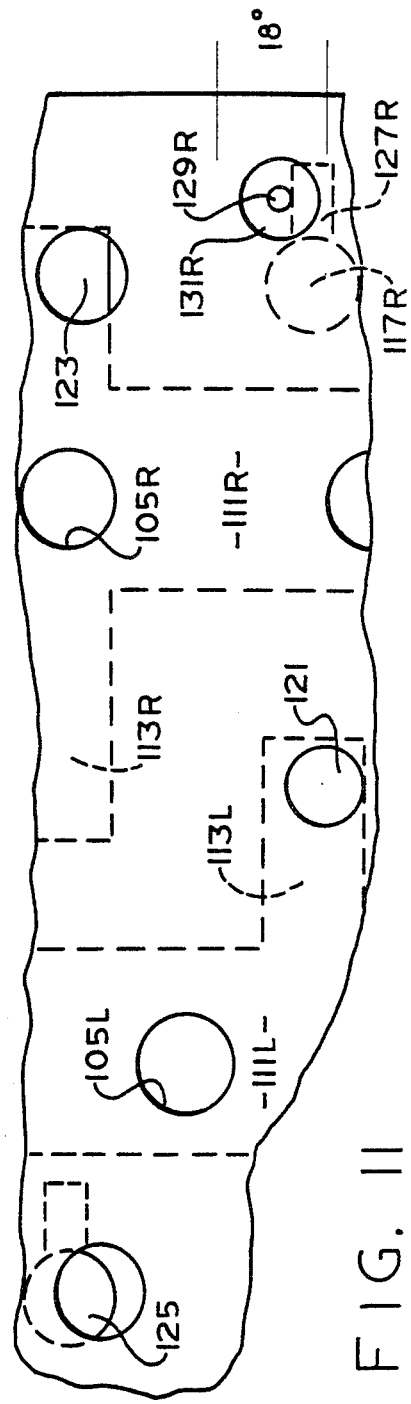
Figure 12:
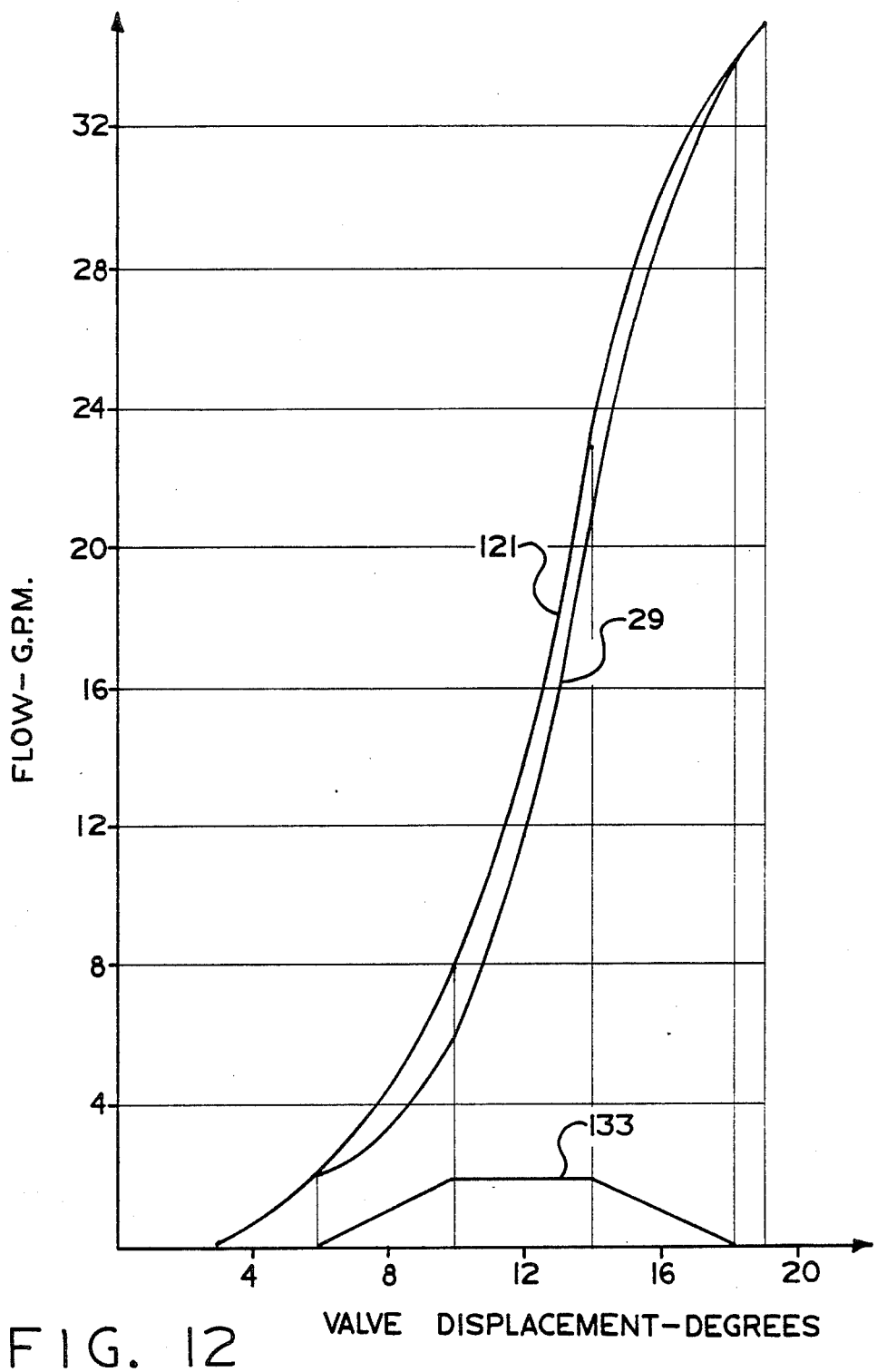
FIG. 12 is a graph of flow versus valve displacement for various fluid flows within the controller of the present invention.

Referring now to FIG. 11, the spool 65 has been displaced by about eighteen degrees relative to the sleeve 67. At this particular valve displacement, the main variable orifice 122 has reached its maximum flow area, and the variable flow control orifices 123 and 125 are also approaching their maximum flow areas, such that the flow curve 121 in FIG. 12 is approaching the maximum flow rate of 35 gpm. However, as the flow curve 121 has been increasing as the valve displacement increased from ten degrees in FIG. 8 to eighteen degrees in FIG. 11, the variable dampening orifice 133 remained at its maximum flow rate of 2 gpm as the valve displacement increased from ten degrees to about fourteen degrees (see FIG. 12), corresponding to the period of valve displacement during which the dampening bore 129 R was in full open communication with the dampening slot 127 R. At about fourteen degrees of valve displacement, the dampening bore 129 R began to move out of communication with the dampening slot 127 R until, with the valve displacement at eighteen degrees as shown in FIG. 11, the variable dampening orifice 133 is now closed, because at maximum valve displacement, dampening is not likely to be needed, whereas it is desirable to be able to communicate all of the fluid flowing through the main variable orifice 121 to the control port 29 and steering cylinder 19. In addition, it is desirable for the variable dampening orifice 133 to be closed when the main variable flow control orifice 121 is at a maximum to prevent travel limit slip from occurring.

Figure 13:
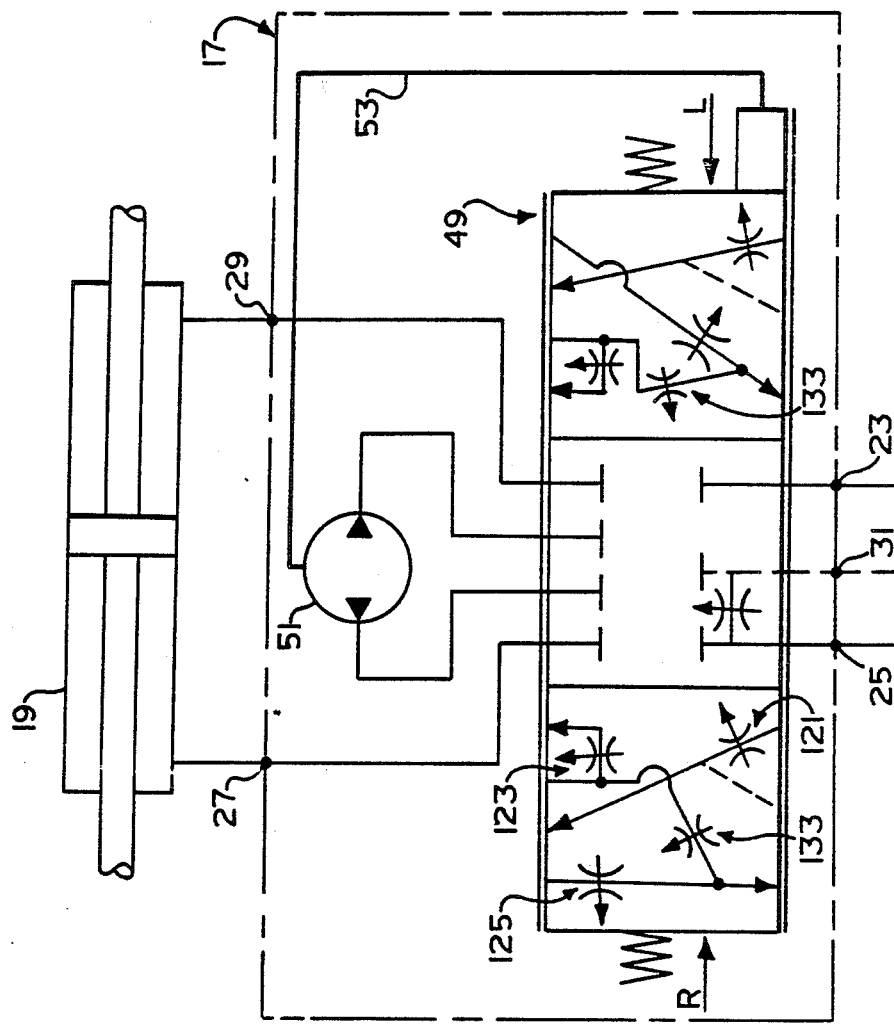
FIG. 13 is a hydraulic schematic, similar to FIG. 1, illustrating an alternative embodiment of the present invention.

Referring now to FIG. 13, there is illustrated an alternative embodiment of the present invention, in which all of the elements bear the same reference numerals as in the embodiment of FIG. 1. The only difference between the embodiment of FIG. 13 and the embodiment of FIG. 1 is that in FIG. 13 the dampening fluid path communicates with the main fluid path at a location which is upstream of the variable flow control orifice 123. Such an arrangement may be slightly less effective in dampening pressure pulses, because the fluid subjected to a pulse must first flow through the variable orifice 123 before being in fluid communication with the dampening fluid path, thus somewhat restricting the communication with the dampening fluid path. On the other hand, in controllers having valving configured as shown in U.S. Pat. No. Re. 25,126, having the dampening fluid path communicate with the main fluid path at a location upstream of the variable orifice 123, as shown in FIG. 13, may facilitate the actual arrangement of the various ports and passages required.

From a review of the foregoing specification, it should be apparent that the present invention provides an improved fluid controller which is capable of substantially reducing or eliminating jerkiness in the steering operation, especially when the controller is used to steer vehicles which are large and heavy, or vehicles which are articulated. The jerkiness is substantially reduced by means of a dampening fluid path in parallel with the main fluid path within the controller, whereby the dampening fluid path is able to dampen or cushion pressure spikes and pressure pulses occurring in the main fluid path within the controller and between the controller and the steering cylinder.

The invention has been described in great detail in the foregoing specification, and it is believed that various alterations and modifications of the invention will become apparent to those skilled in the art from a reading and understanding of this specification. It is intended that all such alterations and modifications are included in the invention, insofar as they come within the scope of the appended claims.

We claim:

1. A controller operable to control the flow of fluid from a source of pressurized fluid to a fluid pressure operated device, said controller being of the type including housing means defining an inlet port for connection to the source of pressurized fluid, a return port for connection to a reservoir, and first and second control fluid ports for connection to the fluid pressure operated device; valve means disposed in said housing means and defining a neutral position and a first operating position; said housing means and said valve means cooperating to define a main fluid path communicating between said inlet port and said first control fluid port and between said second control fluid port and said return port when said valve means is in said first operating position; fluid actuated means for imparting follow-up movement to said valve means proportional to the volume of fluid flow through said main fluid path; said main fluid path including a first variable flow control orifice disposed between said inlet port and said first control fluid port, and having its minimum flow area when said valve means is in said neutral position, and an increasing flow area as said valve means is displaced from said neutral position toward said first operating position, said first variable flow control orifice having its maximum flow area when said valve means is moved to its maximum displacement from said neutral position; characterized by:

(a) said housing means and said valve means cooperating to define a dampening fluid path in parallel with said main fluid path, said dampening fluid path being in fluid communication with said main fluid path at a first location disposed between said first variable flow control orifice and said first control fluid port, and at a second location disposed downstream of said second control fluid port;

(b) said dampening fluid path including a variable dampening orifice operable to dampen the flow of pressurized fluid in said main fluid path to said first control fluid port to thereby cushion the operation of said controller; and (c) said variable dampening orifice begins to open after said first variable flow control orifice begins to open, as said valve means moves from its neutral position to its maximum displacement position.

2. A controller as claimed in claim 1 characterized by said valve means comprising a primary, rotatable valve member and a cooperating, relatively rotatable follow-up valve member, said primary and follow-up valve members defining said neutral position relative to each other.

3. A controller as claimed in claim 2 characterized by said primary and follow-up valve members cooperating to define said first variable flow control orifice and said variable dampening orifice, the flow areas of said variable orifices varying in response to relative rotation of said primary and follow-up valve members.

4. A controller as claimed in claim 2 characterized by said primary and follow-up valve members cooperating to define a second variable flow control orifice disposed in said main fluid path at a location disposed between said first variable flow control orifice and said first control fluid port.

5. A controller as claimed in claim 4 characterized by said dampening fluid path being in fluid communication with said main fluid path at said first location, said first location being disposed between said second variable flow control orifice and said first control fluid port.

6. A controller as claimed in claim 2 characterized by said primary and follow-up valve members cooperating to define a third variable flow control orifice disposed in said main fluid path at a location disposed between said second control fluid port and said return port.

7. A controller as claimed in claim 6 characterized by said dampening fluid path being in fluid communication with said main fluid path at said second location, said second location being disposed between said third variable flow control orifice and said return port.

8. A controller as claimed in claim 1 characterized by said fluid actuated means for imparting follow-up movement comprises a fluid meter disposed in series flow relationship in said main fluid path at a location disposed between said first variable flow control orifice and said first control fluid port 9. A controller as claimed in claim 8 characterized by said dampening fluid path being in fluid communication with said main fluid path at said first location, said first location being disposed between said fluid meter and said first control fluid port.

10. A controller as claimed in claim 8 characterized by said valve means comprising a primary, rotatable valve member, and a cooperating, relatively rotatable follow-up valve member, said fluid meter including a metering member movable to measure the volume of fluid flowing through said main fluid path, said controller further comprising means coupling said metering member to said follow-up valve member.

11. A controller as claimed in claim 1 characterized by said first variable flow control orifice begins to open when said valve means has been displaced from said neutral position by an amount X and said variable dampening orifice begins to open when said valve means has been displaced from said neutral position by an amount between about 1.5X and about 2.5X.

12. A controller as claimed in claim 11 characterized by said valve means comprising a primary, rotatable valve member and a cooperating, relatively rotatable follow-up valve member and said amount X is in the range of about 2 degrees to about 4 degrees of relative rotation of said valve members.

13. A controller as claimed in claim 11 characterized by said variable dampening orifice reaches its maximum flow area when said valve means has been displaced from said neutral position by an amount between about 3X and about 5X.

14. A controller as claimed in claim 1 characterized by said variable dampening orifice beginning to close before said first variable flow control orifice reaches its maximum flow area, as said valve means moves from its neutral position to its maximum displacement position.

15. A controller as claimed in claim 14 characterized by said variable dampening orifice being closed before said first variable flow control orifice reaches it maximum flow area.

16. A controller as claimed in claim 1 characterized by the dampening flow through said variable dampening orifice comprising no more than about 25 percent of the flow through said first variable flow control orifice as said valve means moves from its neutral position to its maximum displacement position.

17. A controller as claimed in claim 16 characterized by said flow through said variable dampening orifice decreasing, as a percentage of the flow through said first variable flow control orifice, after said variable dampening orifice reaches its maximum flow area, as said valve means moves from its neutral position to its maximum displacement position.

18. A controller as claimed in claim 1 characterized by the source of pressurized fluid including a fluid pump and pressure responsive means for varying the delivery of fluid to said controller in response to variations in demand for fluid by said controller, said housing means of said controller defining a load signal port for connection to the pressure responsive means, said load signal port being in fluid communication with said main fluid path at a location disposed downstream of said first variable flow control orifice.

19. A controller as claimed in claim 18 characterized by the pressure responsive means comprising a priority flow control valve disposed in series flow relation between the pump and said controller, the priority flow control valve including an inlet port in fluid communication with the pump, a priority outlet port in fluid communication with the inlet port of said controller, an excess flow outlet port adapted for fluid communication with an auxiliary load circuit, and a priority valve member movable between one position permitting substantially unrestricted fluid communication from said inlet port of said priority valve to said priority outlet port, and another position permitting substantially unrestricted fluid communication from said inlet port to said excess flow outlet port, means biasing said priority valve member toward said one position, said biasing means including means providing fluid communication with said load signal port of said controller.

20. A controller operable to control the flow of fluid from a source of pressurized fluid to a fluid pressure operated device, said controller being of the type including housing means defining an inlet port for connection to the source of pressurized fluid, a return port for connection to a reservoir, and first and second control fluid ports for connection to the fluid pressure operated device; valve means disposed in said housing means and defining a neutral position and a first operating position; said housing means and said valve means cooperating to define a main fluid path communicating between said inlet port and said first control fluid port and between said second control fluid port and said return port when said valve means is in said first operating position; fluid actuated means for imparting follow-up movement to said valve means porportional to the volume of fluid flow through said main fluid path; said main fluid path including a first variable flow control orifice disposed between said inlet port and said first control fluid port, and having its minimum flow area when said valve means is in said neutral position, and an increasing flow area as said valve means is displaced from said neutral position toward said first operating position, said first variable flow control orifice having its maximum flow area when said valve means is moved to its maximum displacement from said neutral position; said main fluid path including a second variable flow control orifice disposed between said first variable flow control orifice and said first control fluid port; said main fluid path further including a third variable flow control orifice disposed between said second control fluid port and said return port, and having its minimum flow area when said valve means is in said neutral position, and an increasing flow area as said valve means is displaced from said neutral position toward said first operating position; characterized by:
(a) said housing means and said valve means cooperating to define a dampening fluid path in parallel with said main fluid path, said dampening fluid path being in fluid communication with said main fluid path at a first location disposed between said first variable flow control orifice and said third variable flow control orifice, and at a second location disposed downstream of said third variable flow control orifice;
(b) said dampening fluid path including a variable dampening orifice operable to dampen the flow of pressurized fluid in said main fluid path to thereby cushion the operation of said controller;
(c) said variable dampening orifice begins to open after said first variable flow control orifice begins to open, as said valve means moves from its neutral position to its maximum displacement position; and
(d) the flow area of said variable dampening orifice and the flow area of said first variable flow control orifice having a known, predetermined relationship.

21. A controller as claimed in claim 20 characterized by said valve means comprising a primary, rotatable valve member and a cooperating, relatively rotatable follow-up valve member, said primary and follow-up valve members cooperating to define said first, second and third variable flow control orifices.

22. A controller as claimed in claim 21 characterized by said dampening fluid path being in fluid communication with said main fluid path at said first location, said first location being disposed between said second variable flow control orifice and said first control fluid port.

23. A controller as claimed in claim 21 characterized by said dampening fluid path being in fluid communication with said main fluid path at said first location, said first location being disposed between said first variable flow control orifice and said second variable flow control orifice.

24. A controller as claimed in claim 21 characterized by said fluid actuated means for imparting followup movement comprises a fluid meter disposed in series flow relationship in said main fluid path at a location disposed between said first variable flow control orifice and said second variable flow control orifice.

25. A controller as claimed in claim 24 characterized by said dampening fluid path being in fluid communication with said main fluid path at said first location, said first location being disposed between said fluid meter and said second variable flow control orifice.

* * * * *